(12) United States Patent
Leung

(10) Patent No.: US 11,560,665 B2
(45) Date of Patent: Jan. 24, 2023

(54) HANDHELD APPLIANCE

(71) Applicant: Conair Corporation, Stamford, CT (US)

(72) Inventor: Anthony Kit Lun Leung, North Point (HK)

(73) Assignee: Conair LLC, Stamford, CT (US)

( * ) Notice: Subject to any disclaimer, the term of this patent is extended or adjusted under 35 U.S.C. 154(b) by 120 days.

(21) Appl. No.: 17/128,840

(22) Filed: Dec. 21, 2020

(65) Prior Publication Data
US 2022/0195657 A1    Jun. 23, 2022

(51) Int. Cl.
| | |
|---|---|
| D06F 39/00 | (2020.01) |
| G05D 9/02 | (2006.01) |
| D06F 73/00 | (2006.01) |
| G05D 9/12 | (2006.01) |
| D06F 87/00 | (2006.01) |
| G05D 9/04 | (2006.01) |

(52) U.S. Cl.
CPC ............ *D06F 39/008* (2013.01); *D06F 73/00* (2013.01); *D06F 87/00* (2013.01); *G05D 9/02* (2013.01); *G05D 9/04* (2013.01); *G05D 9/12* (2013.01)

(58) Field of Classification Search
CPC .......... D06F 73/00; D06F 75/16; D06F 75/18; D06F 75/20; G05D 9/02; F16K 21/20; F16K 24/042; F16K 24/044; F16K 24/046; F16K 24/06; F16K 31/22; F16K 33/00; Y10T 137/2768; Y10T 137/3099; Y10T 137/7426; Y10T 137/6606
See application file for complete search history.

(56) References Cited

U.S. PATENT DOCUMENTS

| | | | | |
|---|---|---|---|---|
| 4,051,205 | A | * | 9/1977 | Grant ................... A61M 16/109 261/153 |
| 4,098,853 | A | * | 7/1978 | Brown ................ A61M 16/167 261/DIG. 65 |
| 4,535,556 | A | | 8/1985 | Cavalli |
| 5,142,124 | A | | 8/1992 | Driessen |
| 5,404,662 | A | * | 4/1995 | Patrick .................... D06F 75/18 38/77.82 |
| 5,414,945 | A | | 5/1995 | Freeman et al. |
| D376,694 | S | | 12/1996 | Aiyar |
| 6,248,007 | B1 | | 6/2001 | De Blois et al. |

(Continued)

FOREIGN PATENT DOCUMENTS

| | | | |
|---|---|---|---|
| CN | 108914521 A | * | 11/2018 |
| CN | 306922148 | | 11/2021 |

(Continued)

OTHER PUBLICATIONS

CN108914521 English machine translation (Year: 2022).*

(Continued)

*Primary Examiner* — Hailey K. Do
(74) *Attorney, Agent, or Firm* — Ruggiero McAllister & McMahon LLC

(57) ABSTRACT

An appliance includes an appliance unit having a housing with the housing having steam emission holes, a heater in the housing, a primary water tank in the housing, and a cradle that is removably connectable to the appliance unit. The cradle has a secondary water tank that can communicate with the primary water tank when the appliance unit is connected to the cradle.

17 Claims, 19 Drawing Sheets

(56) References Cited

U.S. PATENT DOCUMENTS

| | | | |
|---|---|---|---|
| 6,997,183 B2* | 2/2006 | Koch | A61M 16/161 261/142 |
| 7,182,321 B2* | 2/2007 | Huang | F24F 6/00 261/66 |
| D574,568 S | 8/2008 | Lee | |
| D589,663 S | 3/2009 | Massip et al. | |
| D592,365 S | 5/2009 | Massip et al. | |
| D670,876 S | 11/2012 | Vrdoljak et al. | |
| D704,399 S | 5/2014 | Crawley et al. | |
| 8,777,187 B2* | 7/2014 | Wong | F24F 6/04 261/106 |
| 8,893,410 B2 | 11/2014 | Vrdoljak et al. | |
| D776,887 S | 1/2017 | Deffrennes | |
| 9,845,568 B2 | 12/2017 | Fung | |
| 9,854,824 B2 | 1/2018 | Everett, Jr. et al. | |
| D831,905 S | 10/2018 | Benacquisto et al. | |
| D842,559 S | 3/2019 | Yang et al. | |
| D857,313 S | 8/2019 | Smith et al. | |
| 10,758,702 B2* | 9/2020 | Liu | A61M 16/162 |
| D921,305 S | 6/2021 | Zhu | |
| D924,520 S | 7/2021 | Bae et al. | |
| D930,925 S | 9/2021 | Wong | |
| D940,971 S | 1/2022 | Yang | |
| D942,098 S | 1/2022 | Xing et al. | |
| 2002/0157288 A1 | 10/2002 | Valiyambath | |
| 2009/0281523 A1 | 11/2009 | Sacco et al. | |
| 2010/0024492 A1* | 2/2010 | Leung | D06F 73/00 68/222 |
| 2011/0173849 A1* | 7/2011 | Pan | D06F 73/00 38/14 |
| 2012/0039586 A1 | 2/2012 | Collinson et al. | |
| 2012/0181262 A1 | 7/2012 | Shimosaka et al. | |
| 2017/0260685 A1 | 9/2017 | Fung | |
| 2018/0305855 A1 | 10/2018 | Javit et al. | |
| 2020/0005632 A1 | 2/2020 | Lin et al. | |
| 2021/0277591 A1 | 9/2021 | Lai | |
| 2021/0324571 A1 | 10/2021 | Lai et al. | |

FOREIGN PATENT DOCUMENTS

| | | | |
|---|---|---|---|
| GB | 616571 A * | 1/1949 | |
| WO | WO-0153596 A1 * | 7/2001 | D06F 75/12 |

OTHER PUBLICATIONS

WO01/53596 English machine translation (Year: 2022).*

International Search Report dated Mar. 2, 2022 from International Patent Application No. PCT/US2021/063538, 3 pages.

Written Opinion dated Mar. 2, 2022 from International Patent Application No. PCT/US2021/063538, 8 pages.

* cited by examiner

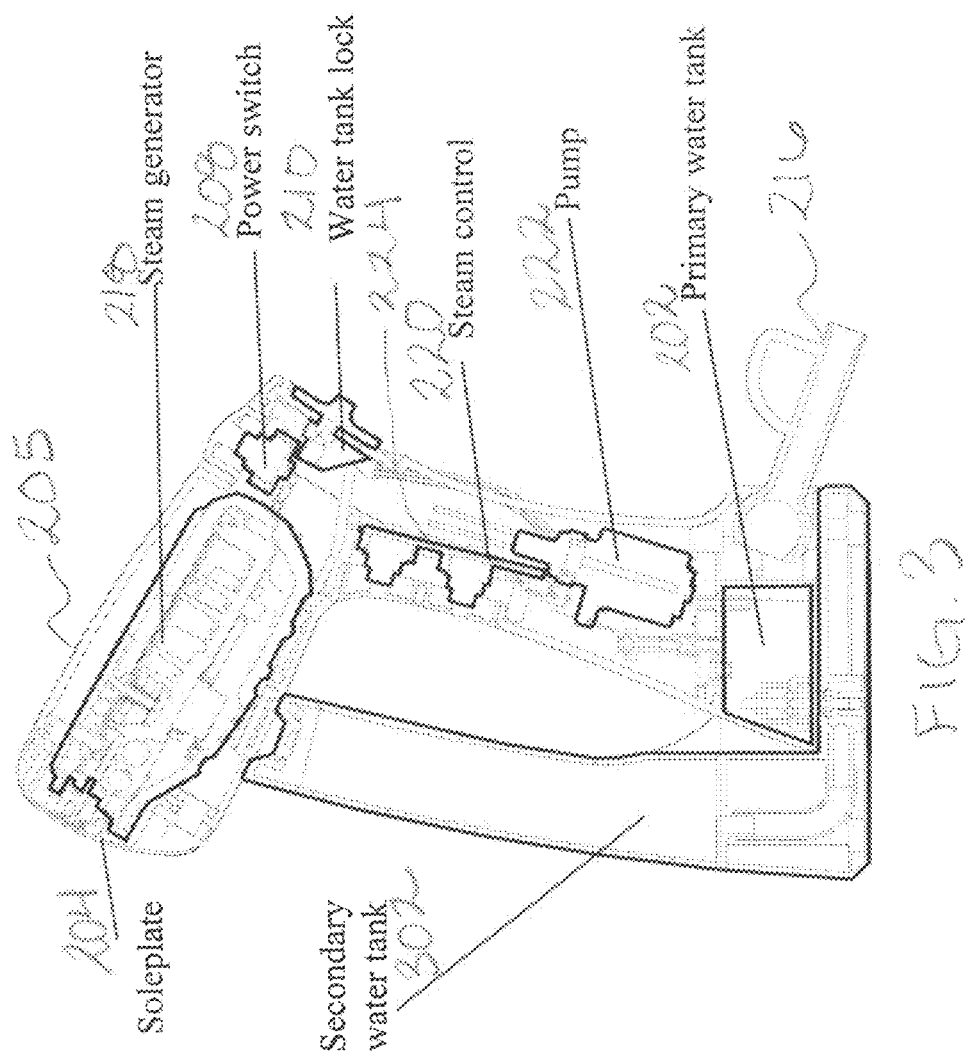

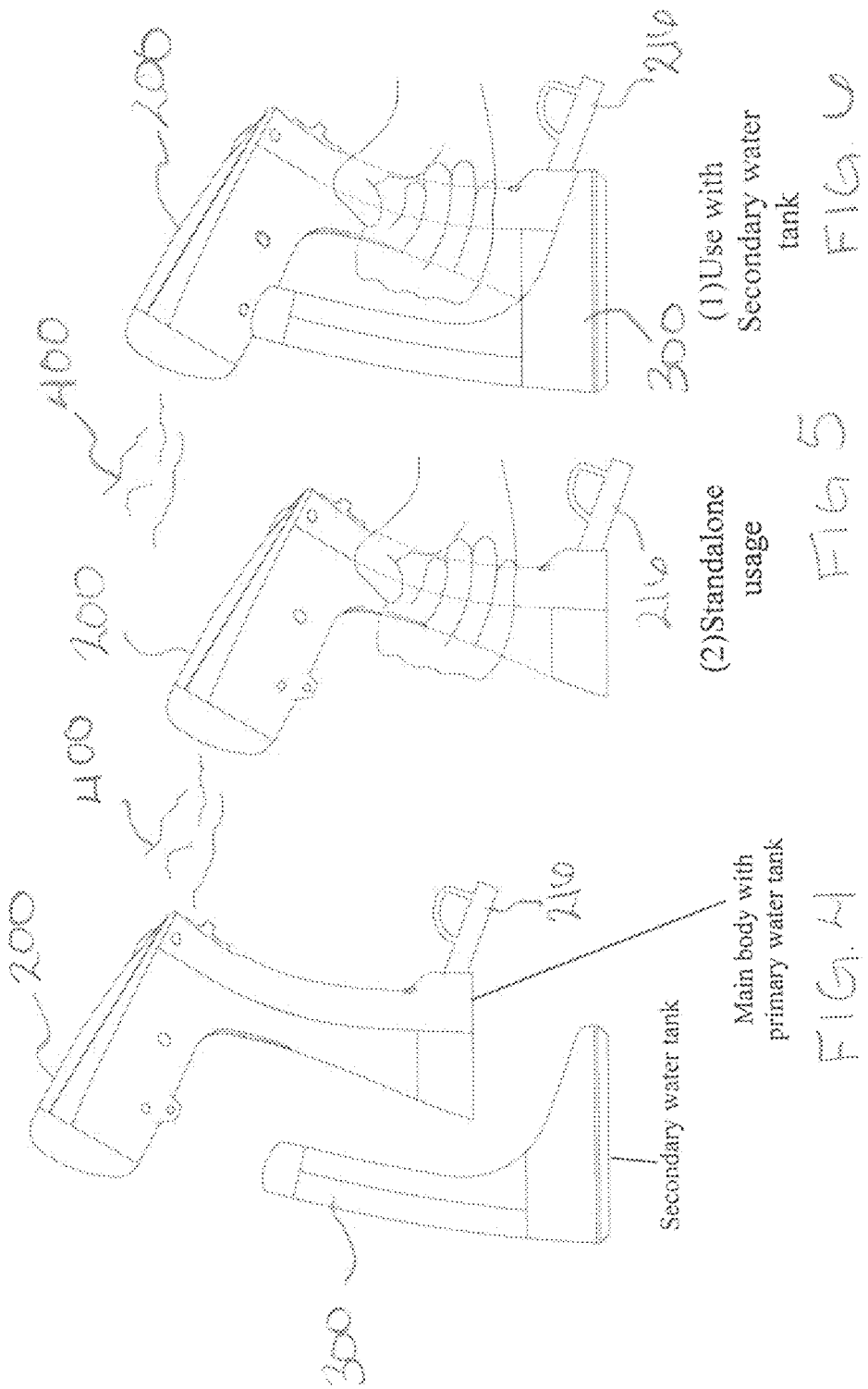

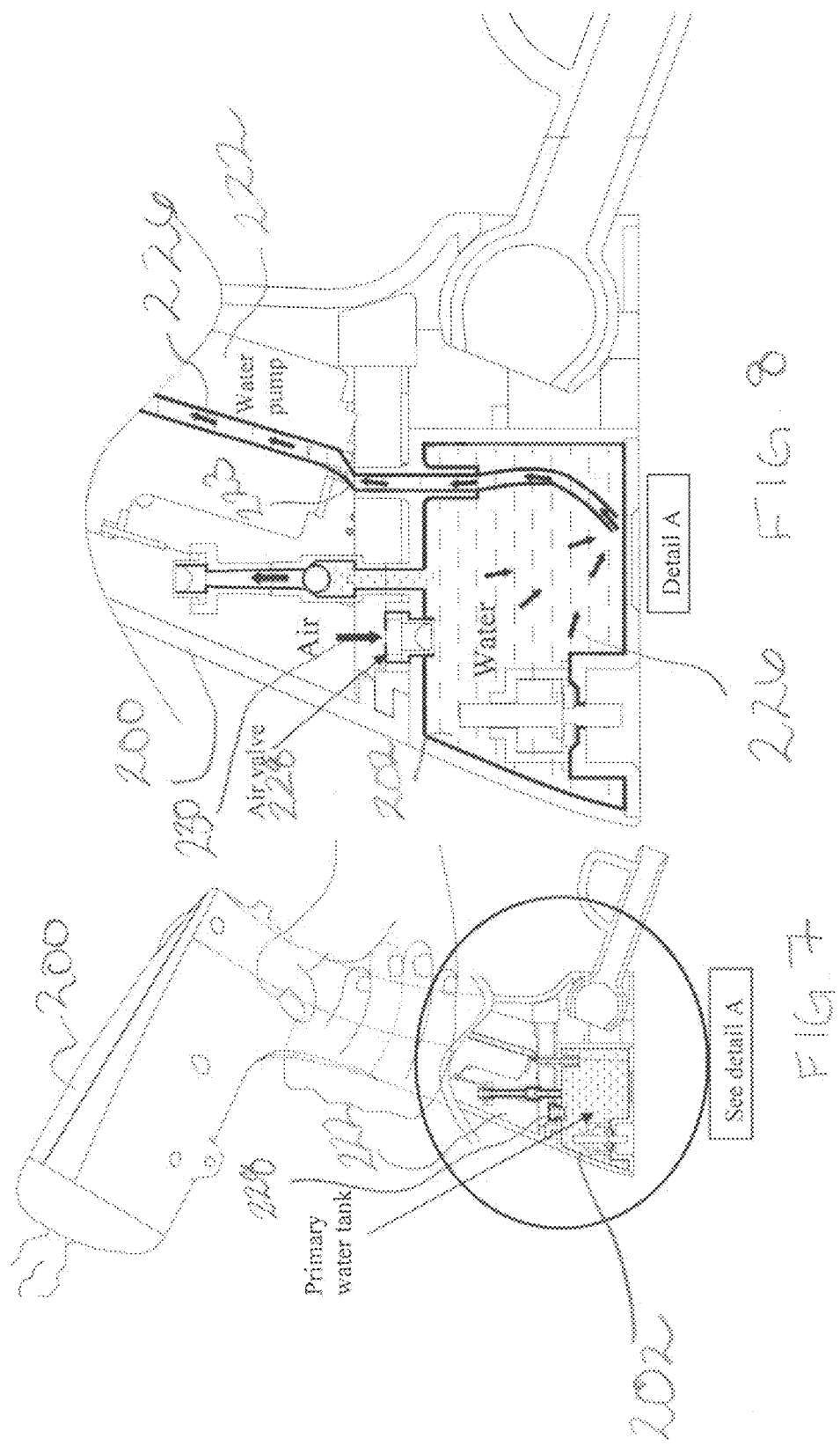

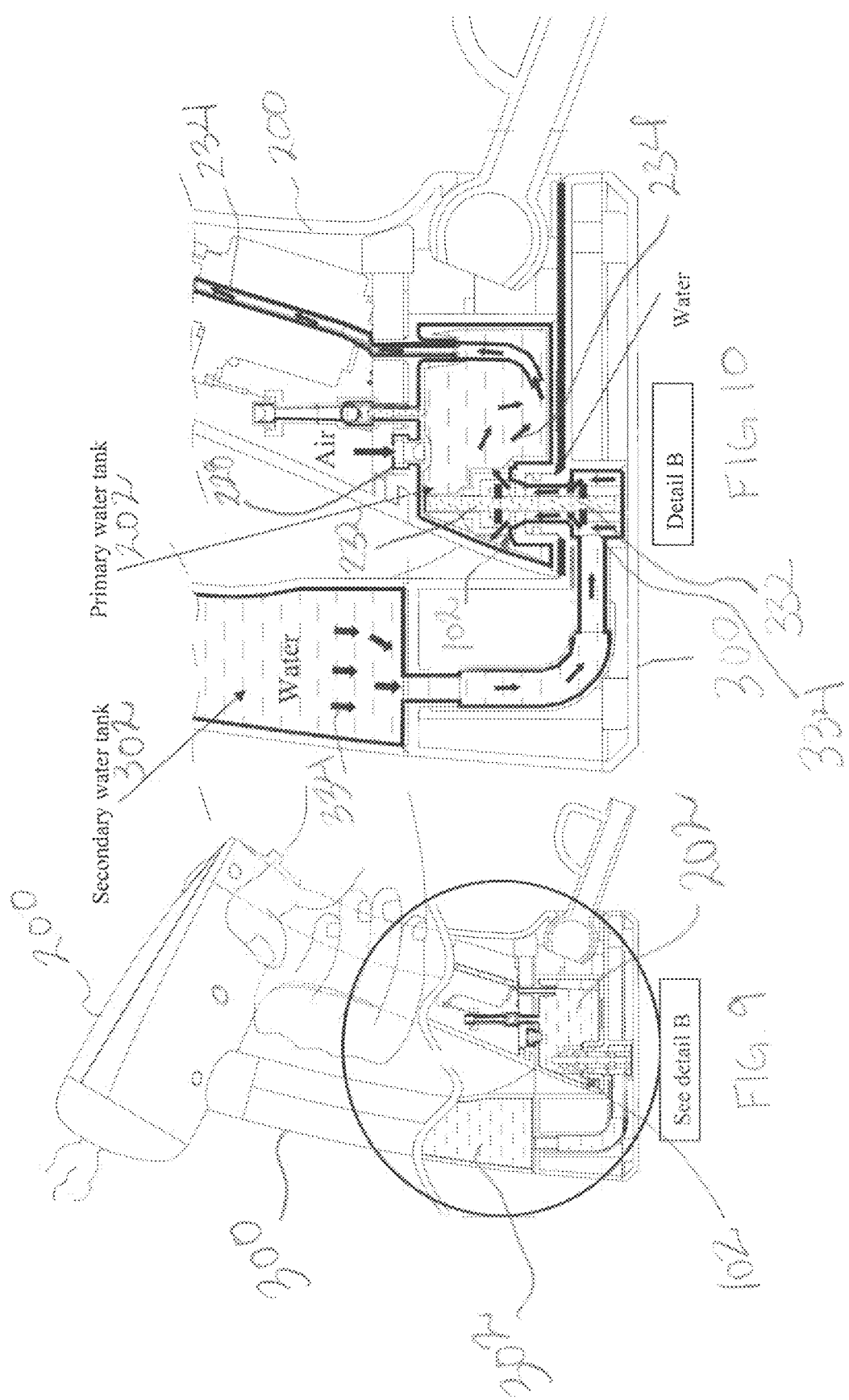

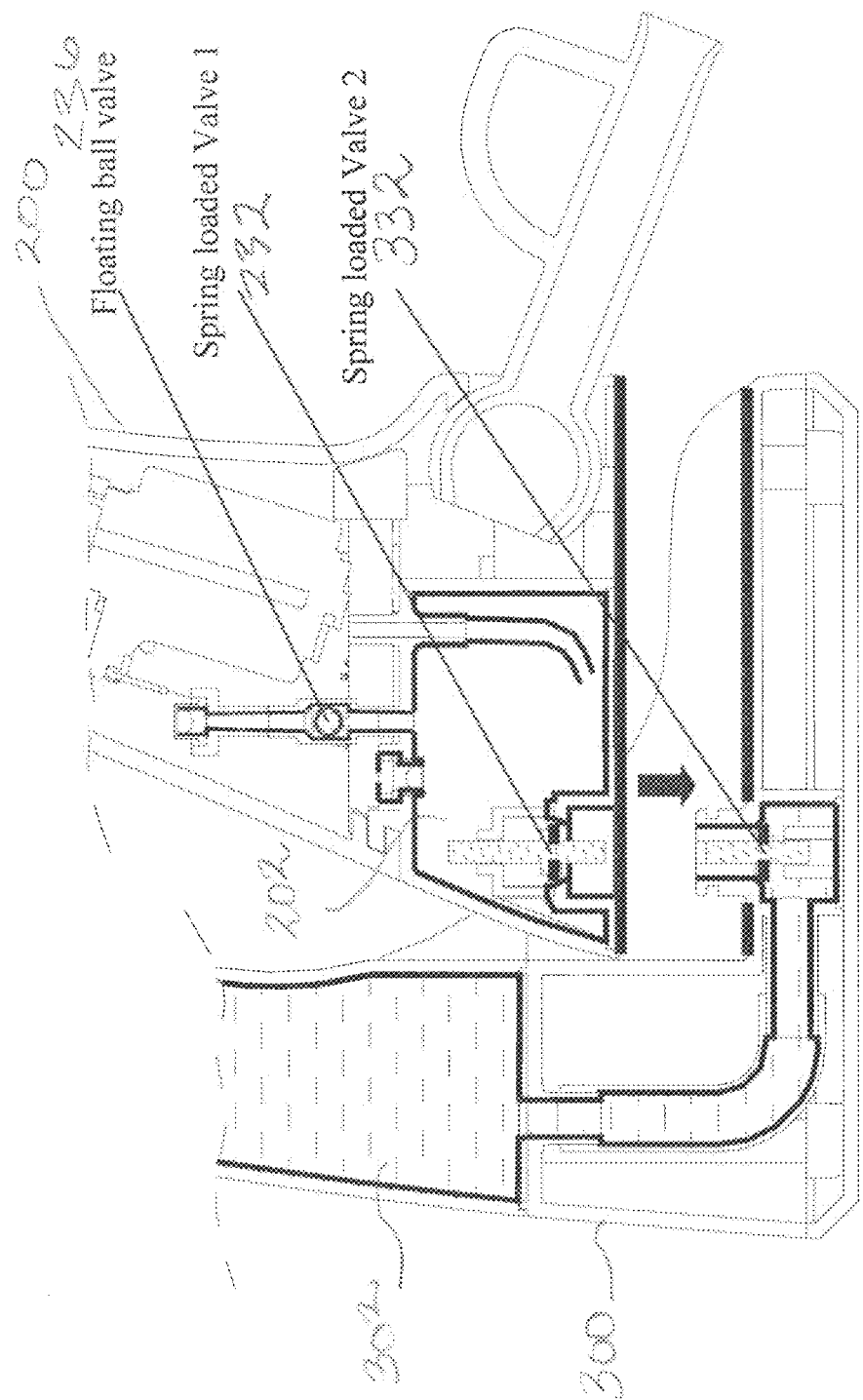

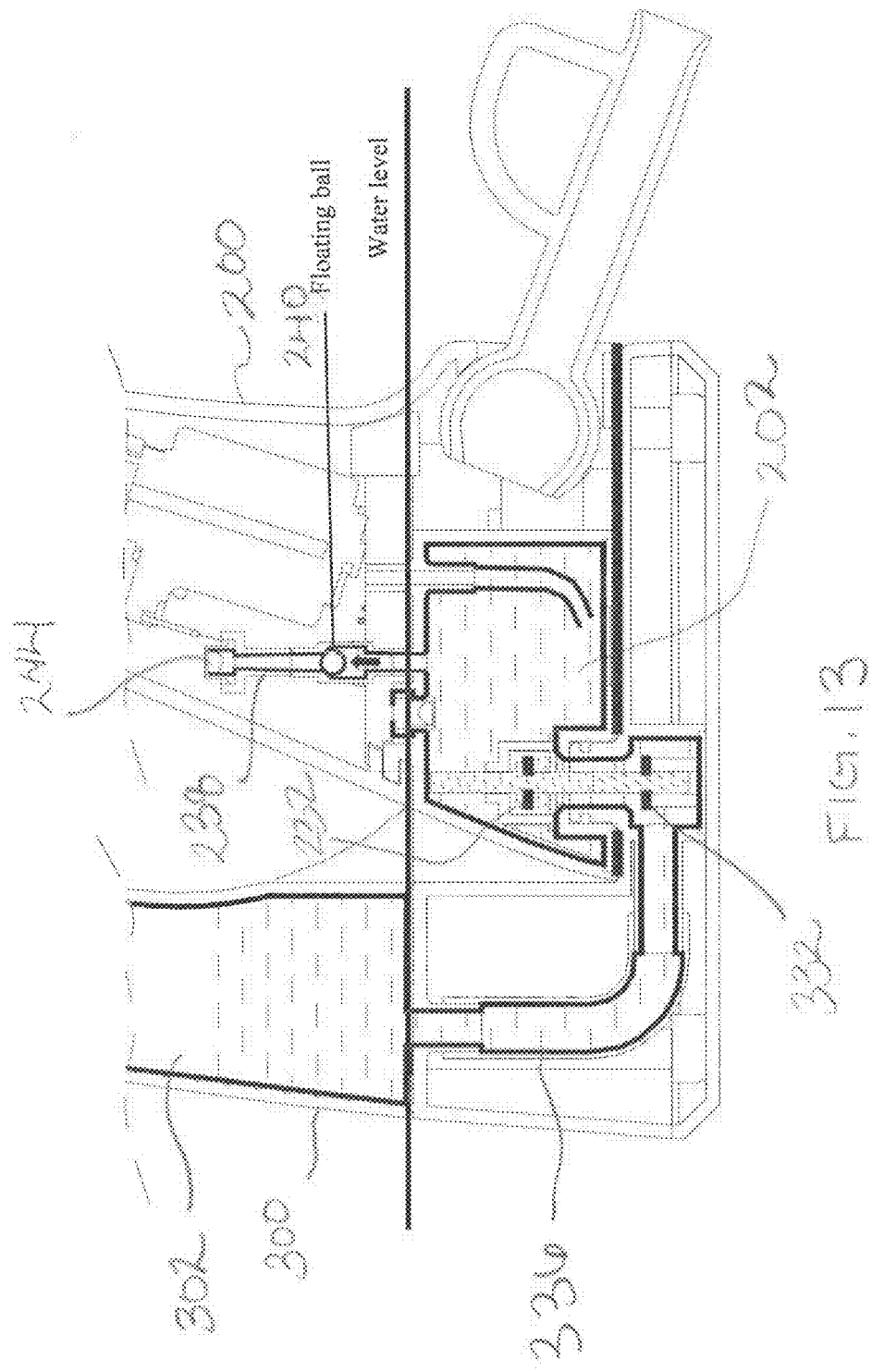

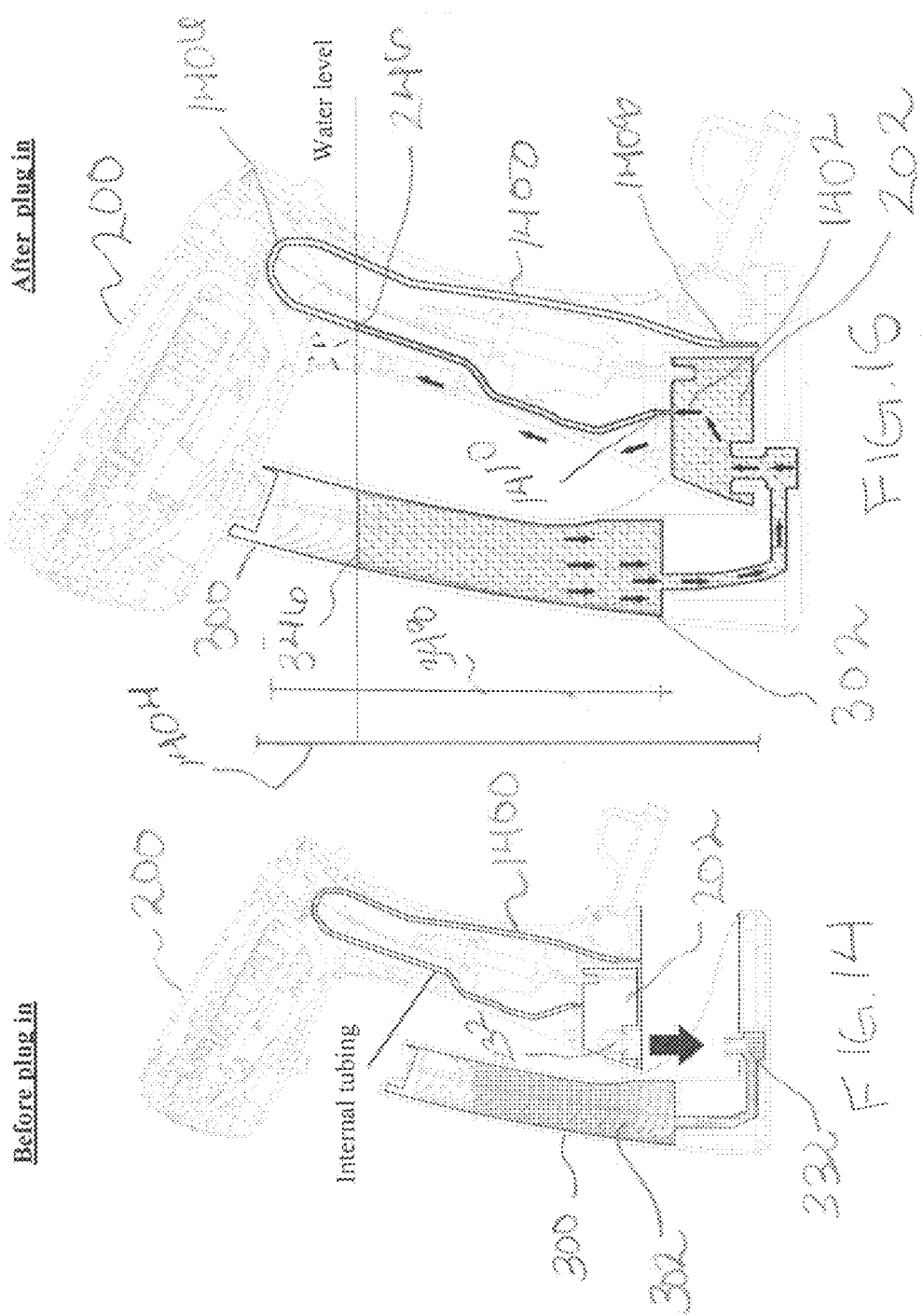

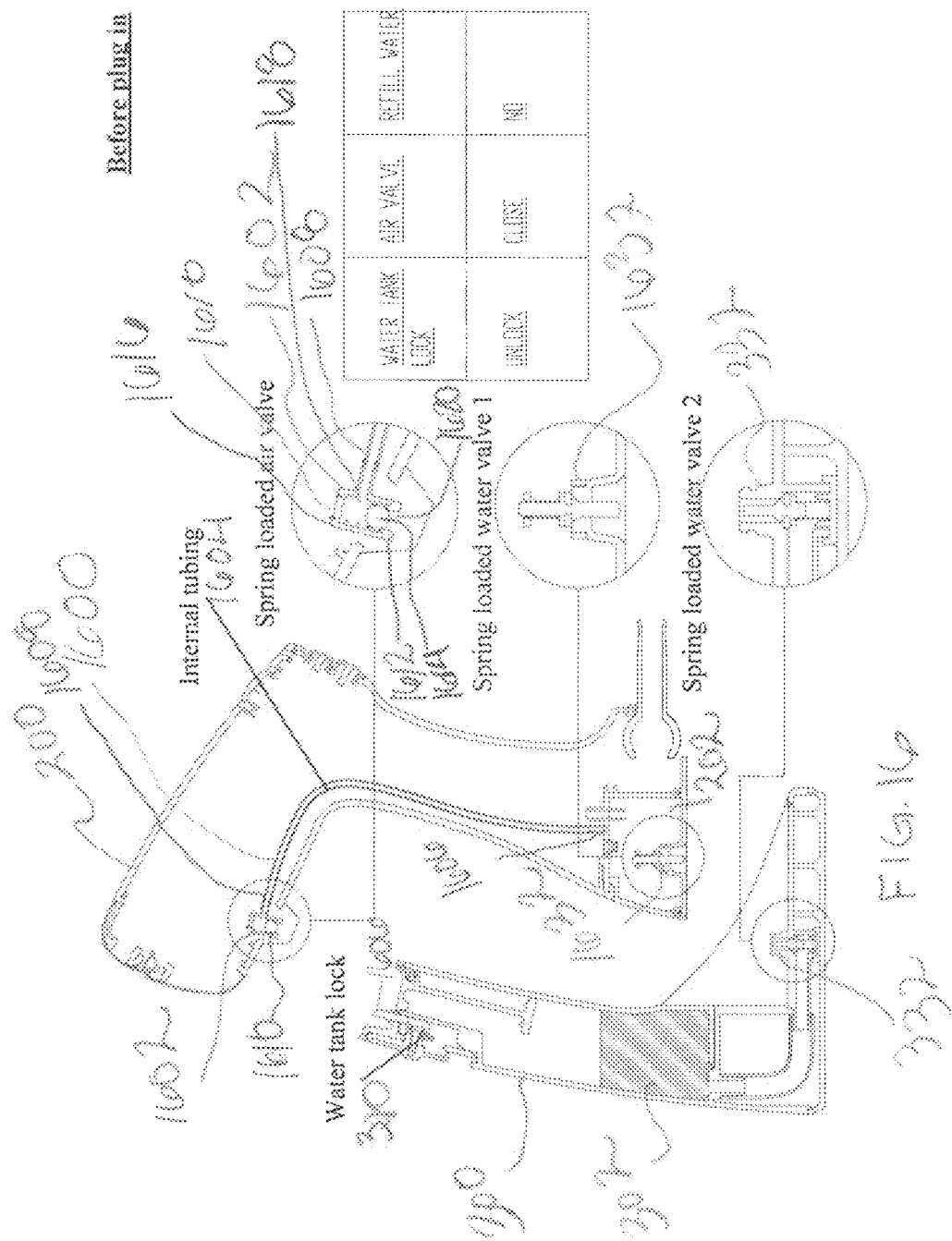

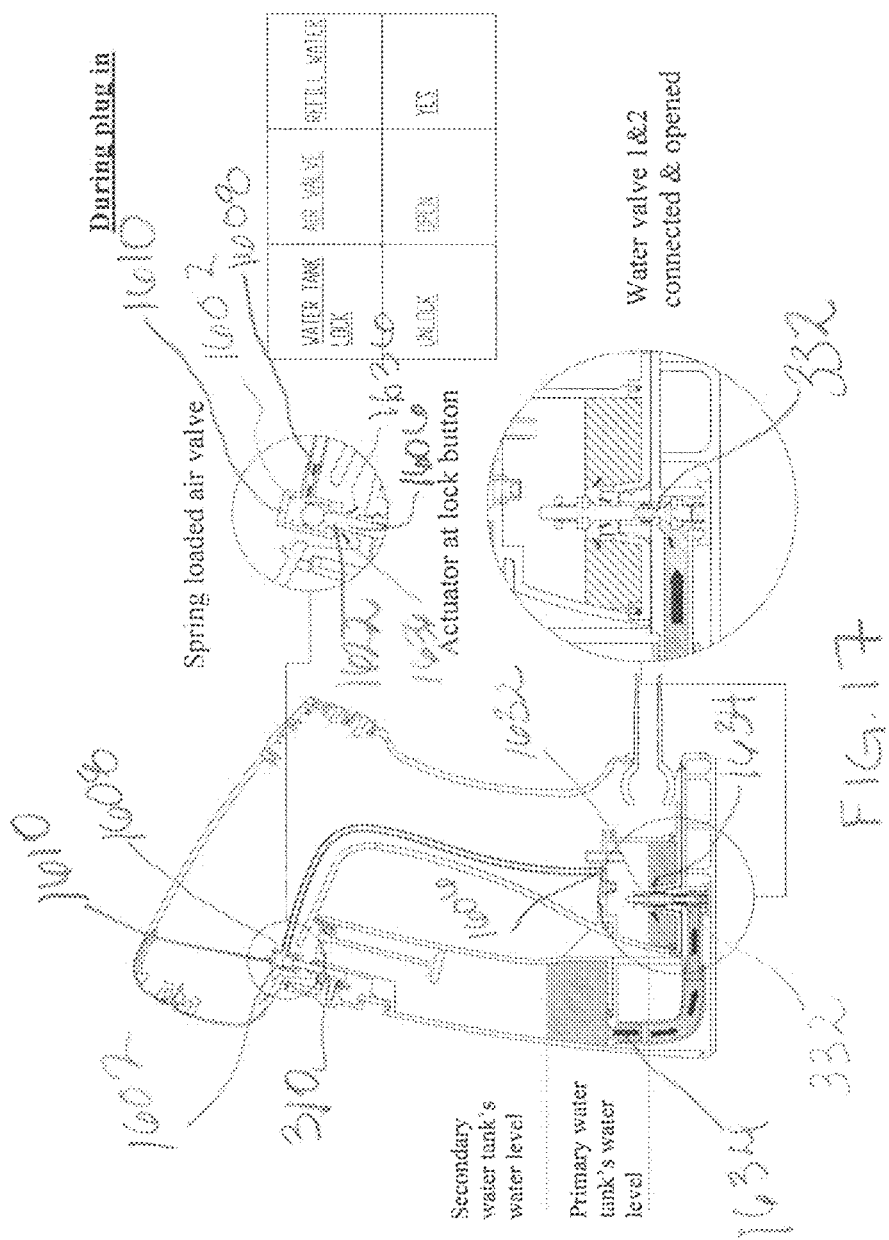

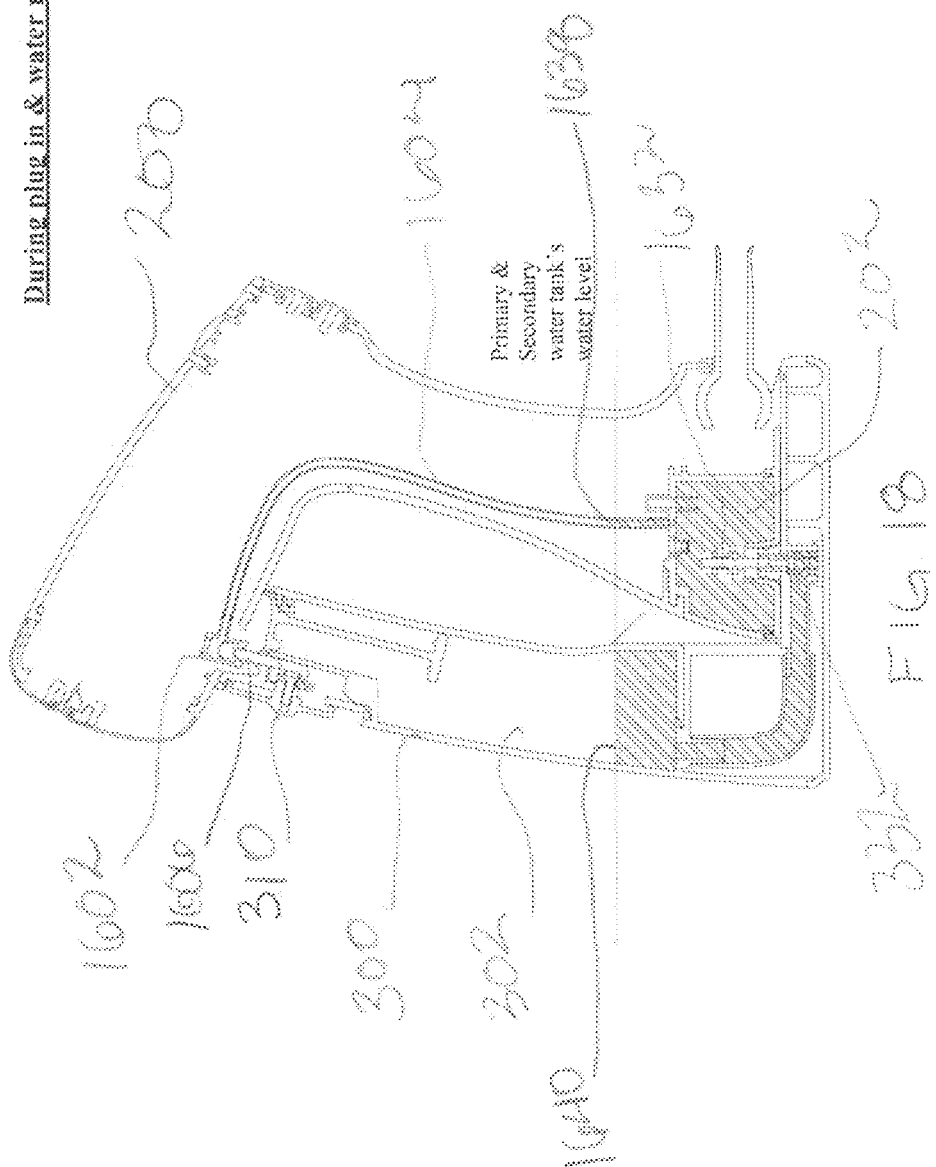

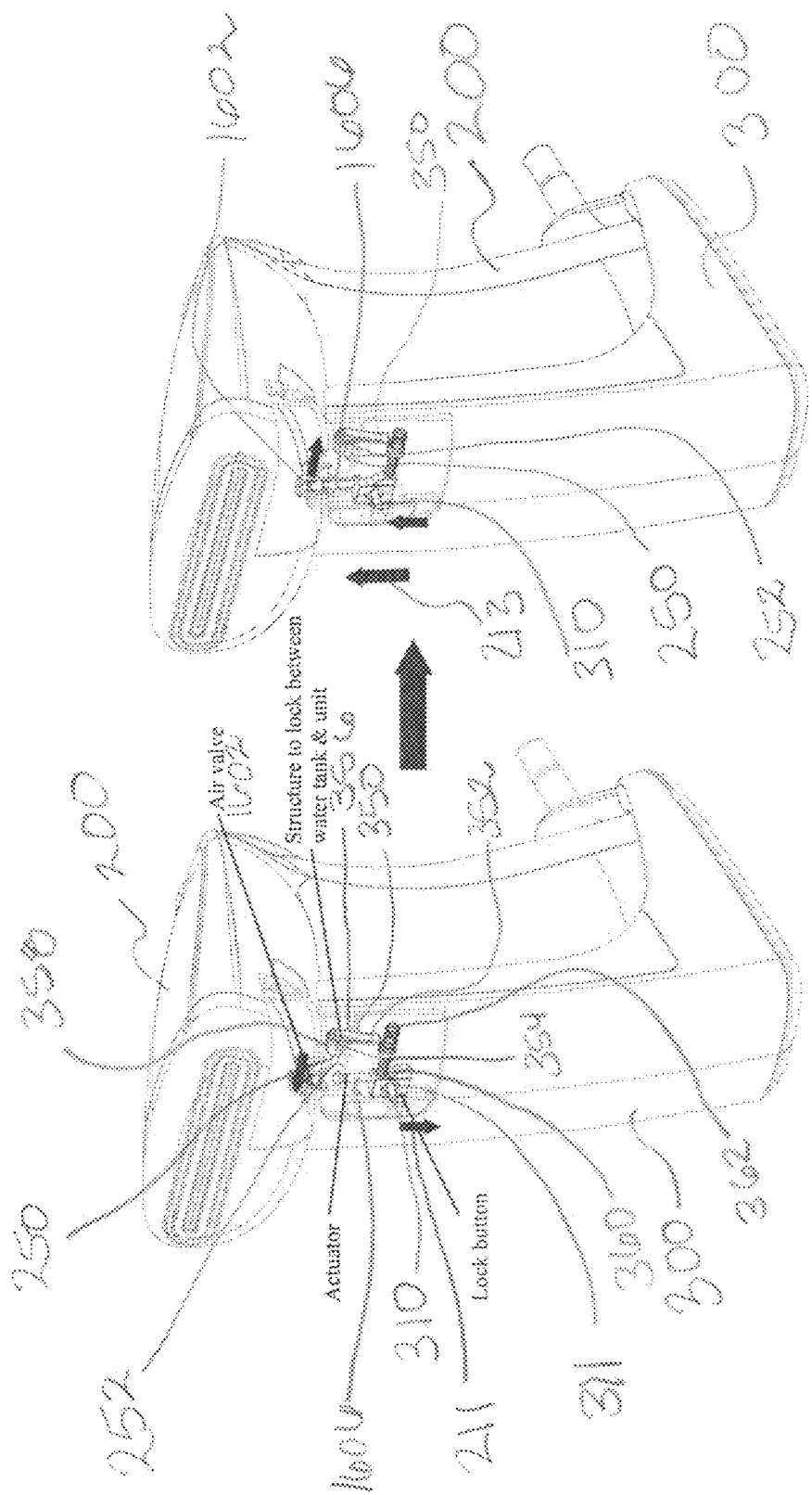

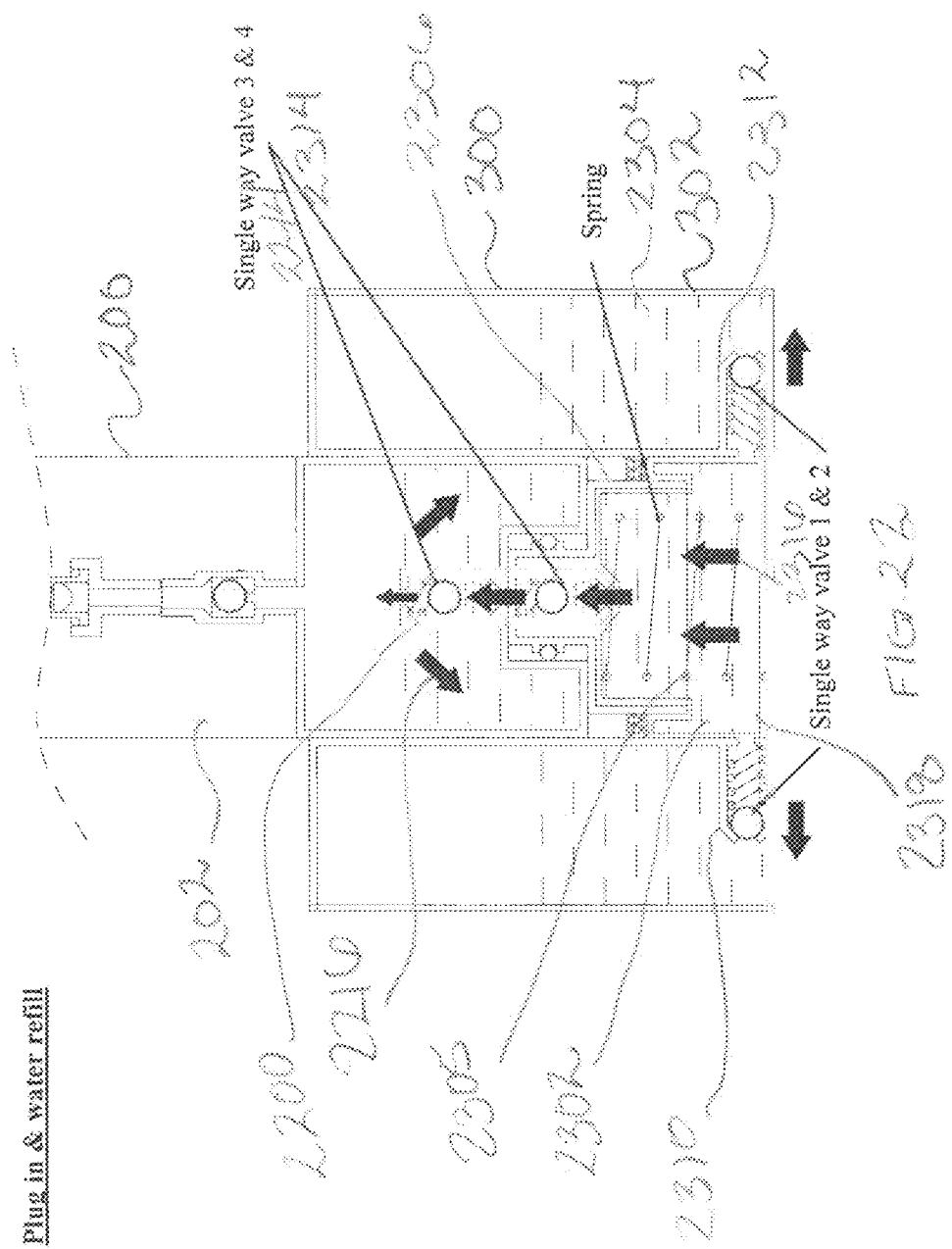

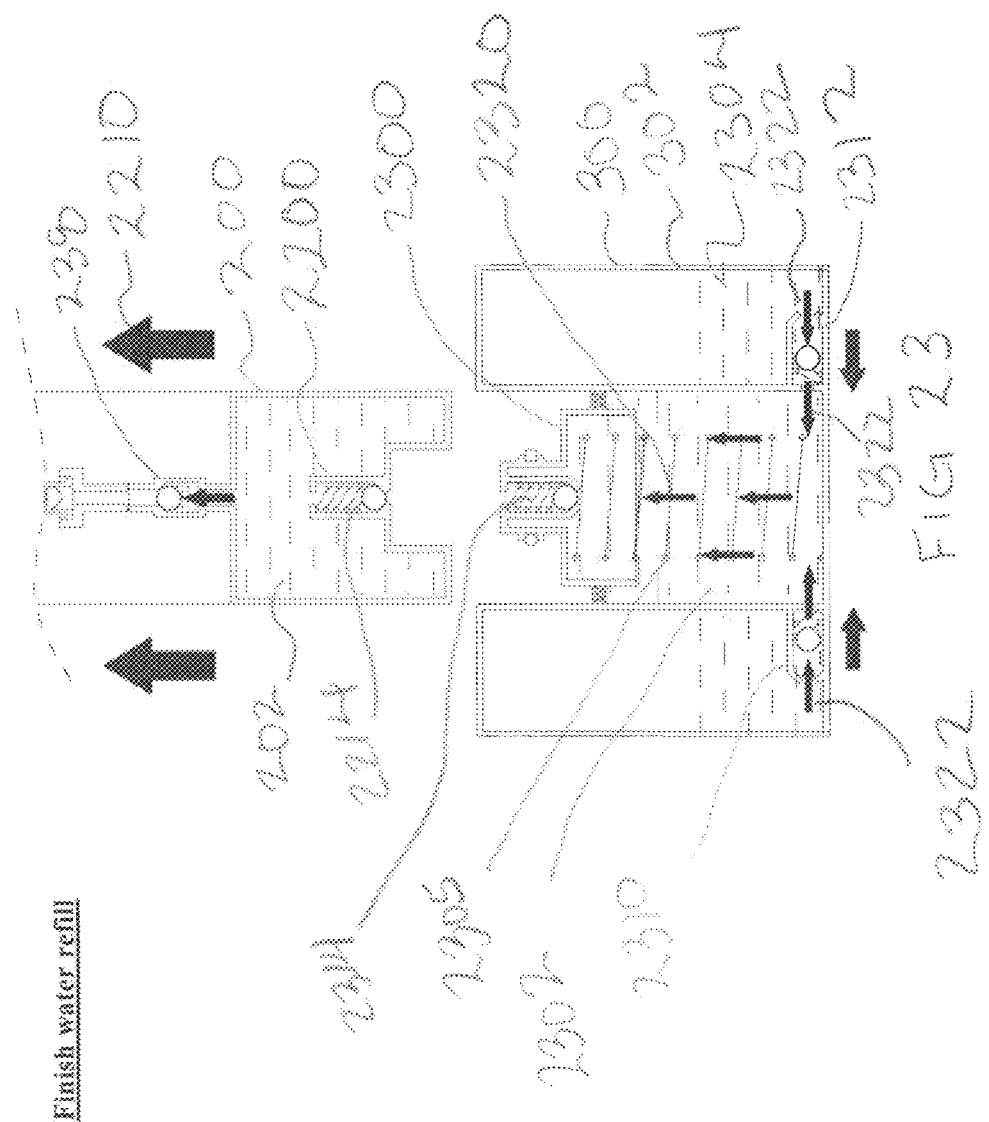

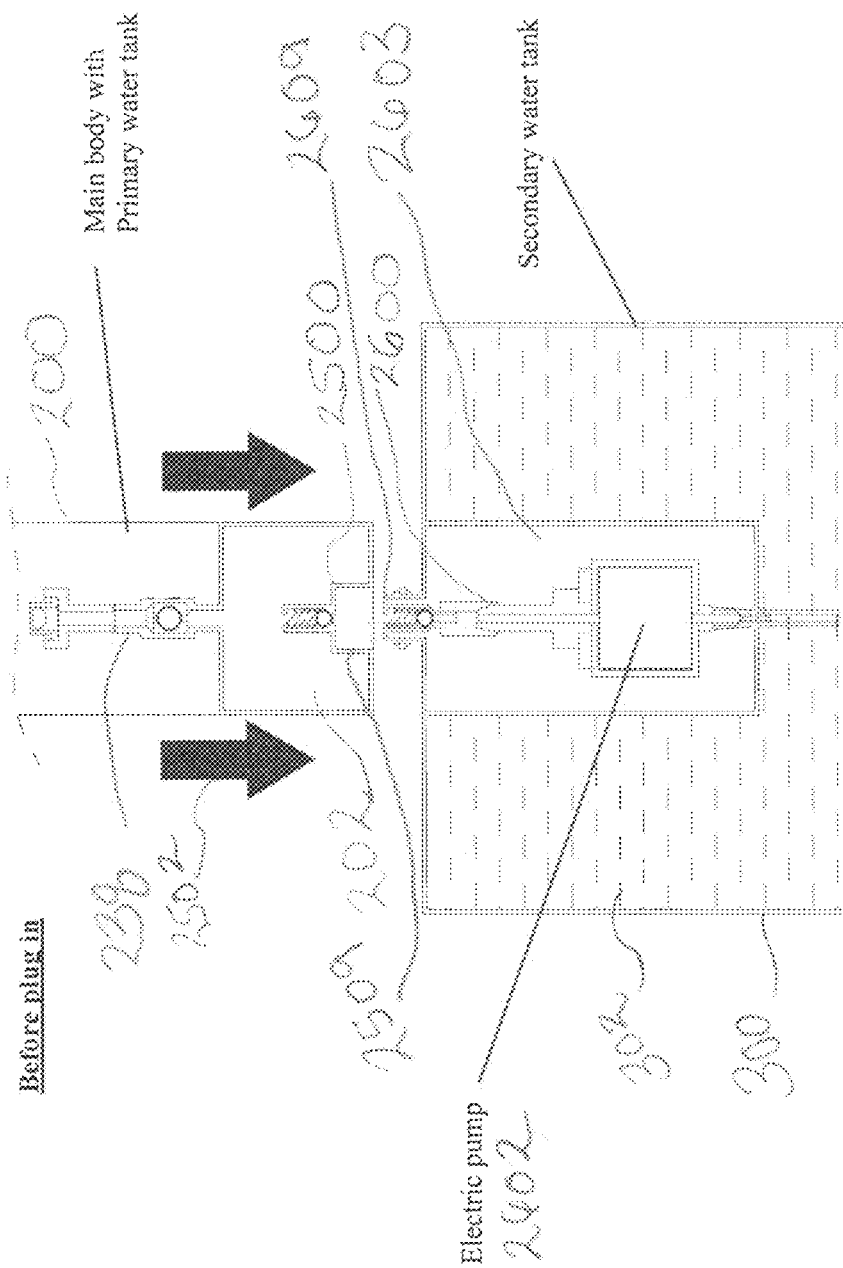

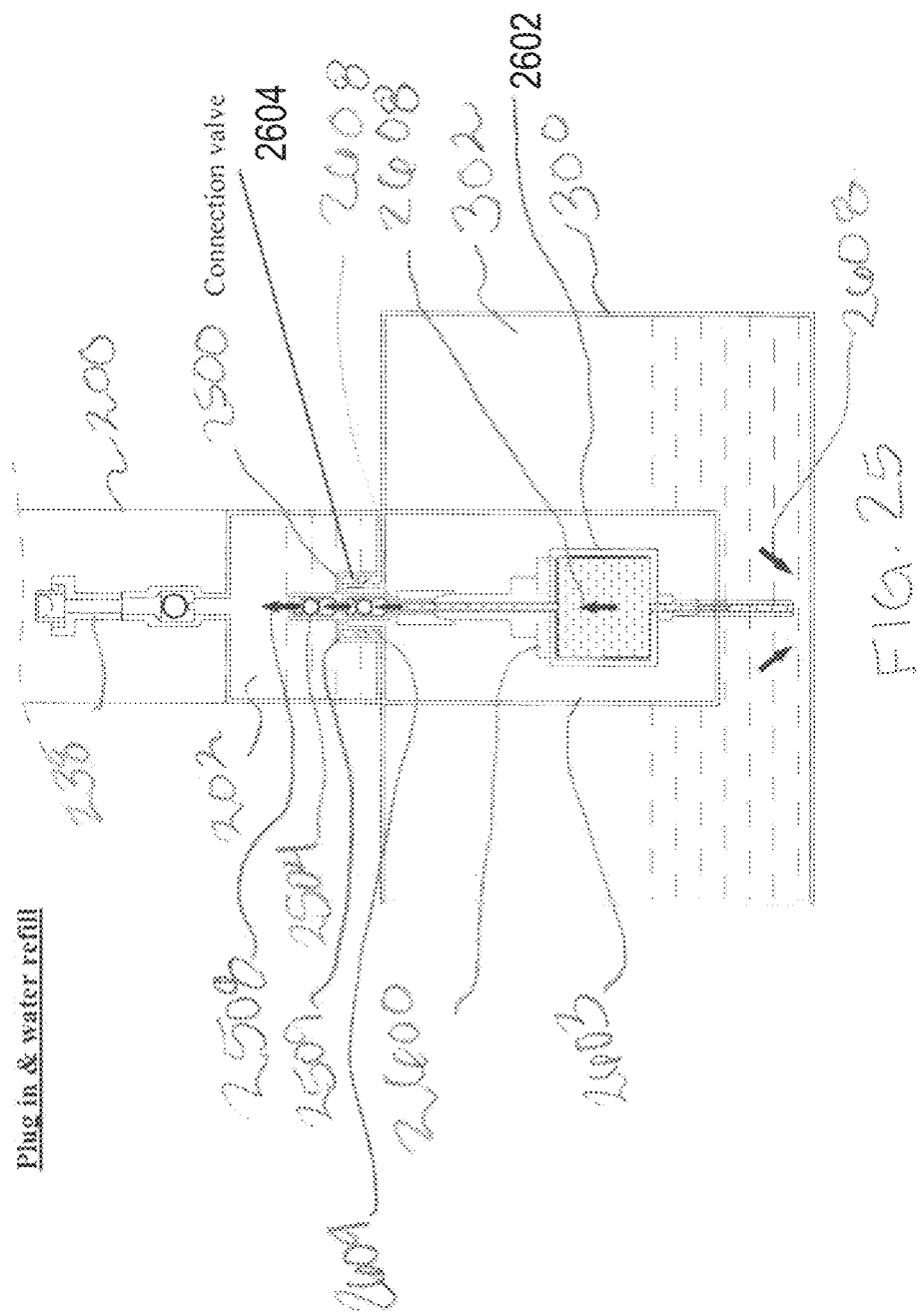

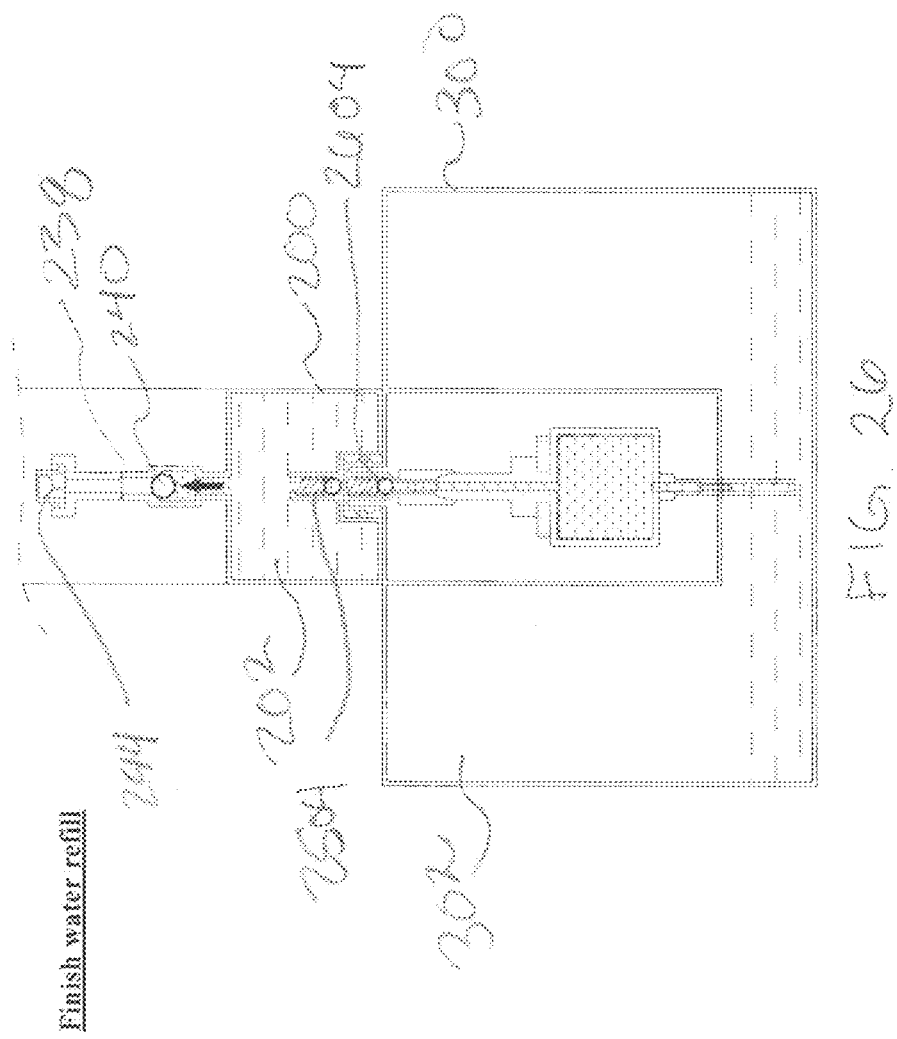

HANDHELD APPLIANCE

BACKGROUND OF THE DISCLOSURE

1. Field of the Disclosure

The present disclosure relates to a handheld appliance. More particularly, the present disclosure relates to a handheld appliance having a primary water tank connectable to a cradle having a secondary water tank.

2. Description of the Related Art

Some handheld appliances require water tanks, for example, handheld fabric steamers. Handheld fabric steamers apply steam to remove wrinkles from, to clean, and to deodorize fabrics, such as clothing garments, draperies, upholstery, and other items. In such appliances, water is placed in a water tank and heated to produce steam and that steam is emitted through a nozzle or steam outlet that a user directs toward the fabric. If the handheld fabric steamer uses all of the water in the water tank, then a user will need to wait for the handheld fabric steamer to cool off before refilling the water tank. If the user has not finished using the handheld fabric steamer, waiting for the handheld fabric steamer to cool off before refilling the water tank is undesirable. If the handheld appliance requires a bigger water tank, then the bigger water tank results in an undesirably heavier weight.

Accordingly, there remains a need for improving the handheld appliances that require water tanks.

SUMMARY

The present disclosure provides a handheld appliance, such as a fabric steamer, having a primary water tank connectable to a cradle with a secondary water tank so that the primary water tank can be refilled by the secondary water tank. This eliminates the need for the fabric steamer to cool off before commencing refilling of the primary water tank, especially if a user runs out of water and has not yet finished using the fabric steamer.

The present disclosure also provides a handheld appliance having a primary water tank connectable to a cradle that is lightweight for users' comfort yet provides for refilling of the water in the primary water tank without delay.

In an embodiment of the present disclosure, a handheld appliance includes an appliance unit having a housing having steam emission holes, a heater in the housing, a primary water tank in the housing, and a cradle that is removably connectable to the appliance unit. The cradle has a secondary water tank that can communicate with the primary water tank when the appliance unit is connected to the cradle.

The above and other objects, features, and advantages of the present disclosure will be apparent and understood by those skilled in the art from the following detailed description, drawings, and accompanying claims. As shown throughout the drawings, like reference numerals designate like or corresponding parts.

BRIEF DESCRIPTION OF THE DRAWINGS

FIG. 3 is a side cross-sectional view of the fabric steamer of FIG. 1.

FIG. 4 is a side view of the fabric steamer of FIG. 1 having a main body with the primary water tank separated from a cradle with the secondary water tank.

FIG. 5 is a side view of the main body with the primary water tank of FIG. 4.

FIG. 6 is a side view of the fabric steamer of FIG. 1 having the main body with the primary water tank connected to the cradle with the secondary water tank.

FIG. 7 is a side view of the main body with the primary water tank of FIG. 4 having a portion that is in cross-section to show the primary water tank inside of the main body.

FIG. 8 is an enlarged partial view of the portion that is in cross-section of FIG. 7 schematically showing flow of water and air.

FIG. 9 is a side view of the main body with the primary water tank connected to the cradle with the secondary water tank of FIG. 4 having a portion that is in cross-section to show the primary water tank inside of the main body and the secondary water tank inside of the cradle.

FIG. 10 is an enlarged partial view of the portion that is in cross-section of FIG. 9 schematically showing flow of water and air.

FIG. 11 is an enlarged partial cross-sectional view of the main body with the primary water tank separated from the cradle with the secondary water tank of FIG. 4 schematically showing a direction the main body moves to connect to the cradle.

FIG. 13 is an enlarged partial cross-sectional view of the main body with the primary water tank connected to the cradle with the secondary water tank of FIG. 4 schematically showing a state where the flow of water from the secondary water tank to the primary water tank is stopped.

FIG. 14 is a side cross-sectional view of the main body with the primary water tank that is separated from the cradle with the secondary water tank of the fabric steamer of FIG. 1 that is modified with an alternative water refill system.

FIG. 15 is a side cross-sectional view of the main body with the primary water tank connected to the cradle with the secondary water tank of the fabric steamer of FIG. 14 that schematically shows a water level in the primary water tank and the secondary water tank when a water flow from the secondary water tank to the primary water tank stops.

FIG. 16 is a side cross-sectional view of the main body with the primary water tank separated from the cradle with the secondary water tank of the fabric steamer of FIG. 1 having components removed and that is modified with an alternative water refill system.

FIG. 17 is a side cross-sectional view of the main body with the primary water tank connected to the cradle with the secondary water tank of the fabric steamer of FIG. 16 that schematically shows a flow of water from the secondary water tank to the primary water tank and a flow of air out of the primary water tank.

FIG. 18 is a side cross-sectional view of the main body with the primary water tank connected to the cradle with the secondary water tank of the fabric steamer of FIG. 16 that schematically shows a water level in the secondary water tank when a water flow from the secondary water tank to the primary water tank stops.

FIG. 19 is a front perspective view of the fabric steamer of FIG. 16 illustrating a portion as transparent to show a lock button assembly that is in a lock position.

FIG. 20 is a front perspective view of the fabric steamer of FIG. 16 illustrating a portion as transparent to show the lock button assembly of FIG. 19 that is in an unlocked position.

FIG. 22 is a front cross-sectional view of the main body with the primary water tank connected to the cradle with the secondary water tank of the fabric steamer of FIG. 21 that schematically shows a water level in the primary water tank and the secondary water tank when a water flow from the secondary water tank flows to the primary water tank.

FIG. 23 is a front cross-sectional view of the main body with the primary water tank separated from the cradle with the secondary water tank of the fabric steamer of FIG. 21 that schematically shows movement of the of the primary water tank, water flow in the primary water tank, water flow in the of the secondary water tank, and movement of a piston in the secondary water tank.

FIG. 24 is a front cross-sectional view of the main body with the primary water tank separated from the cradle with the secondary water tank of the fabric steamer of FIG. 1 that is modified with another alternative water refill system having an electric pump refill.

FIG. 25 is a front cross-sectional view of the main body with the primary water tank connected to the cradle with the secondary water tank of the fabric steamer of FIG. 24 that schematically shows a water level in the primary water tank and the secondary water tank when a water flow from the secondary water tank flows to the primary water tank.

FIG. 26 is a front cross-sectional view of the main body with the primary water tank connected to the cradle with the secondary water tank of the fabric steamer of FIG. 25 that schematically shows a water level in the primary water tank and the secondary water tank when the water flow from the secondary water tank to the primary water tank is stopped.

DETAILED DESCRIPTION OF THE DISCLOSURE

Figure 2:
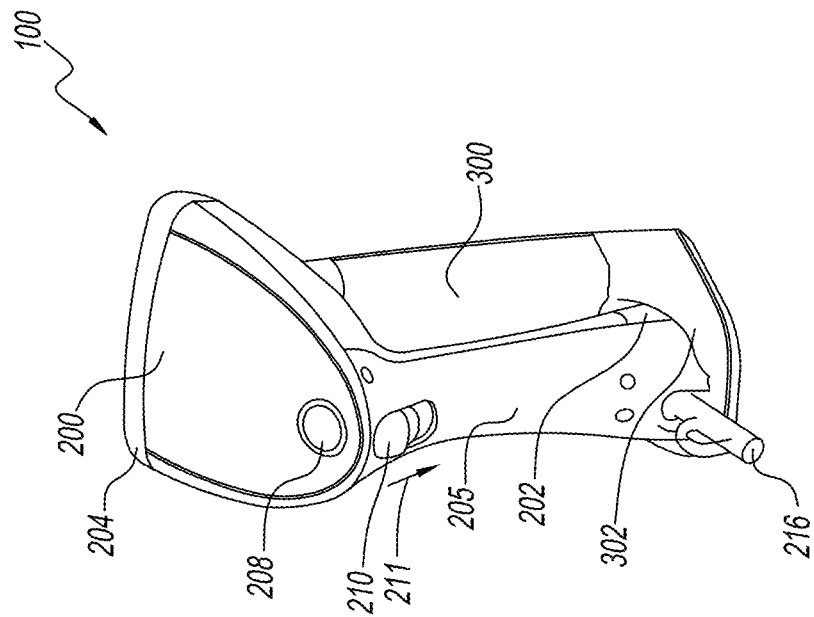
FIG. 2 is a rear perspective view of the fabric steamer of FIG. 1.
Figure 1:
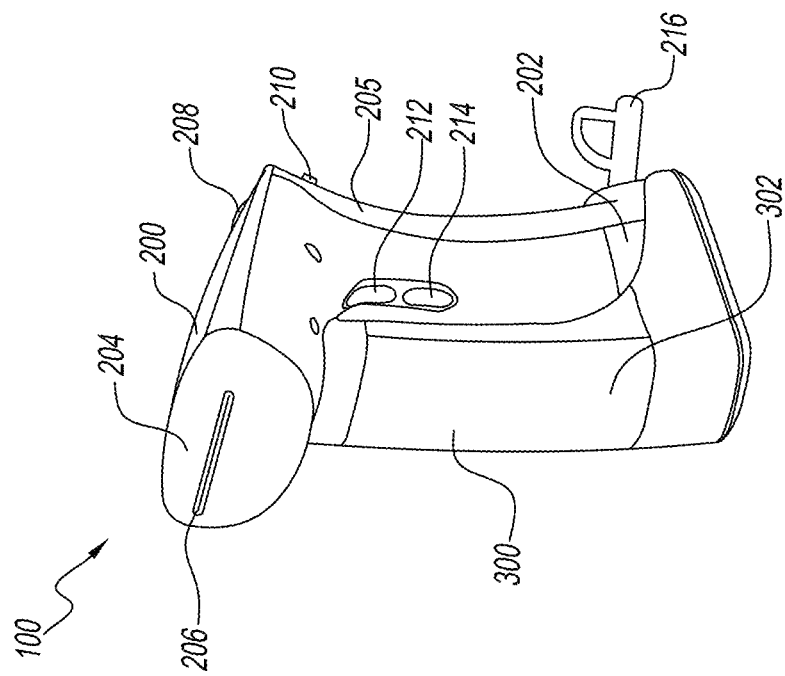
FIG. 1 is a front perspective view of a handheld appliance that is a fabric steamer having a primary water tank and a secondary water tank according to the present disclosure.

An appliance assembly 100 ("appliance 100") according to the present disclosure is shown in FIGS. 1 and 2. Appliance 100 has an appliance unit 200 that is removably connectable to cradle 300. Appliance 100 can be a fabric steamer or other handheld appliance that includes a water tank. Appliance unit 200 has a primary water tank 202. Cradle 300 has a secondary water tank 302. Primary water tank 202 is removably connectable to secondary water tank 302 so that secondary water tank 302 can refill primary water tank 202. This eliminates a need to wait for appliance 100 to cool off before refilling primary water tank 202 if a user runs out of water and has not yet finished using appliance unit 200. It is also desirable to keep appliance 100 lightweight for users' comfort. It is further desirable that this appliance 100 has a way to refill water primary water tank 202 without delay.

When appliance unit 200 is a fabric steamer as shown herein, appliance unit 200 has a soleplate 204 connected to a housing 205. Appliance unit 200 has an outlet 206 through soleplate 204. Appliance unit 200 further includes a power switch 208, a water tank lock 210, steam control buttons 212, 214, and power cord sleeve 216. A user can press power switch 208 to selectively connect and disconnect power from the power source to appliance unit 200. Water tank lock 210 has a mechanism that is movable as shown by arrow 211 from a locked position, as shown in FIG. 2, that maintains appliance unit 200 connected to cradle 300, to an unlocked position that allows appliance unit 200 to disconnect from cradle 300. Water tank lock 210 is movable in a direction that is opposite the direction as shown by arrow 211 from the unlocked position to the locked position, as shown in FIG. 2, to maintain appliance unit 200 connected to cradle 300. The user can press steam control buttons 212, 214 to selectively commence emitting steam, adjust emission of steam, and stop emitting steam from appliance unit 200. Cord sleeve 216 surrounds a power cord to supply power to fabric steamer 100 from a power supply, for example, an electrical outlet.

Referring to FIG. 3, housing 205 houses a steam generator 218, a steam control 220, and a pump 222. Steam generator 218 heats water from primary water tank 202 forming steam that is emitted through outlet 206. Soleplate 204 is heated by the steam and steam generator 218, and can contact fabric for ironing. Steam control 220 has a circuit board 224. Steam control 220 controls the formation of steam and/or temperature of steam with steam control buttons 212, 214 to increase or decrease formation of steam. Pump 222 creates pressure drawing water from primary water tank 202, through pump 222, and through steam generator 218 generating steam that is emitted out outlet 206 through soleplate 204. Primary water tank 202 connects to pump 222, for example, by tubing 223 shown in FIG. 8. Pump 222 connects to steam generator 218, for example, by tubing (not shown). Primary water tank 202 is connected to secondary water tank 302 so that primary water tank 202 can be refilled by secondary water tank 302 as described further herein. Primary water tank 202 and secondary water tank 302 each can be built in or removable.

Referring to FIGS. 4-6, in operation, a power cord that is threaded through cord sleeve 216 connects to a power source, for example, an electrical outlet. A user can depress power switch 208 to selectively supply power to appliance unit 200 turning on appliance unit 200. When appliance unit 200 is on, power is supplied to steam generator 218, steam control 220, and pump 222. The user can press control buttons 212, 214 to selectively commence emitting steam 400, for example, to activate pump 222. Pump 222 creates pressure drawing water from primary water tank 202, through pump 222, and through steam generator 218 generating steam that is emitted out outlet 206 through soleplate 204. The user can press control buttons 212, 214 to selectively stop emitting steam 400 by, for example, deactivating pump 222 by pressing one of steam control buttons 212, 214 and power switch 208.

Referring to FIG. 4, appliance unit 200 can be used with or without cradle 300. Appliance unit 200 without cradle 300 can effect steam ironing without secondary water tank 302. When primary water tank 202 is empty, a user can plug appliance unit 200 into cradle 300, as shown in FIG. 1, to connect primary water tank 202 and secondary water tank 302 as a refill station for quick water fill up. Once primary water tank 202 is fully filled, the user can unplug secondary water tank 302, as shown in FIG. 4, and continue steam ironing using appliance unit 200, again without cradle 300, and secondary water tank 302, as shown in FIG. 5.

Primary water tank 202 can be relatively small. Secondary water tank 302 has a larger capacity than primary water tank 202 and provides a longer steam time when appliance unit 200 is operated while connected to cradle 300 as shown in FIG. 6. When appliance unit 200 is operated while connected to cradle 300, secondary water tank 302 can continuously supply water to primary water tank 202 to continue to emit steam 400.

Referring to FIGS. 7 and 8, when appliance unit 200 is used without cradle 300, water that is filled into primary water tank 202 either from secondary water tank 302 or, alternatively, primary water tank 202. Appliance unit 200 can be modified to have an opening that is opened and closed to fill primary water tank 202 with water while appliance unit 200 is not connected to cradle 300. When pump 222 is on, water is drawn from primary water tank 202 via pump 222 to steam generator 218 as shown by arrows 226. Primary water tank 202 has an air valve 228 to allow an airflow into primary water tank 202, as shown by arrow 230. This airflow replenishes air into primary water tank 202 to balance the pressure inside primary water tank 202 when the water is drawn from primary water tank 202 via pump 222 to steam generator 218. Secondary water tank 302 can also have an air valve similar to air valve 228.

Primary water tank 202 is connected to secondary water tank 302 so that secondary water tank 302 can refill primary water tank 202. FIGS. 9 and 10 illustrate one way primary water tank 202 can connect to secondary water tank 302 so that secondary water tank 302 can refill primary water tank 202. When secondary water tank 302 is plugged into primary water tank 202, both primary water tank 202 and secondary water tank 302 are connected via a water valve assembly 102.

Water valve assembly 102 has a primary water valve 232 and a secondary water valve 332. During water pumping by pump 222, water is drawn from primary water tank 202, as shown by arrows 234, at the same time, water in secondary water tank 302, as shown by arrows 334, refills primary water tank 202 to keep primary water tank 202 fully filled until secondary water tank 302 is empty.

As shown in FIG. 11, before the user starts filling water from secondary water tank 302 to primary water tank 202 or when primary water tank 202 is separated or disconnected from secondary water tank 302, a primary water valve 232 and a secondary water valve 332 are closed. Primary water tank 202 has a float ball valve 236 that is in an open position because of gravity when primary water tank 202 is separated from secondary water tank 302. Primary water tank 202 can be in an empty, partially filled or fully filled status.

Figure 12:
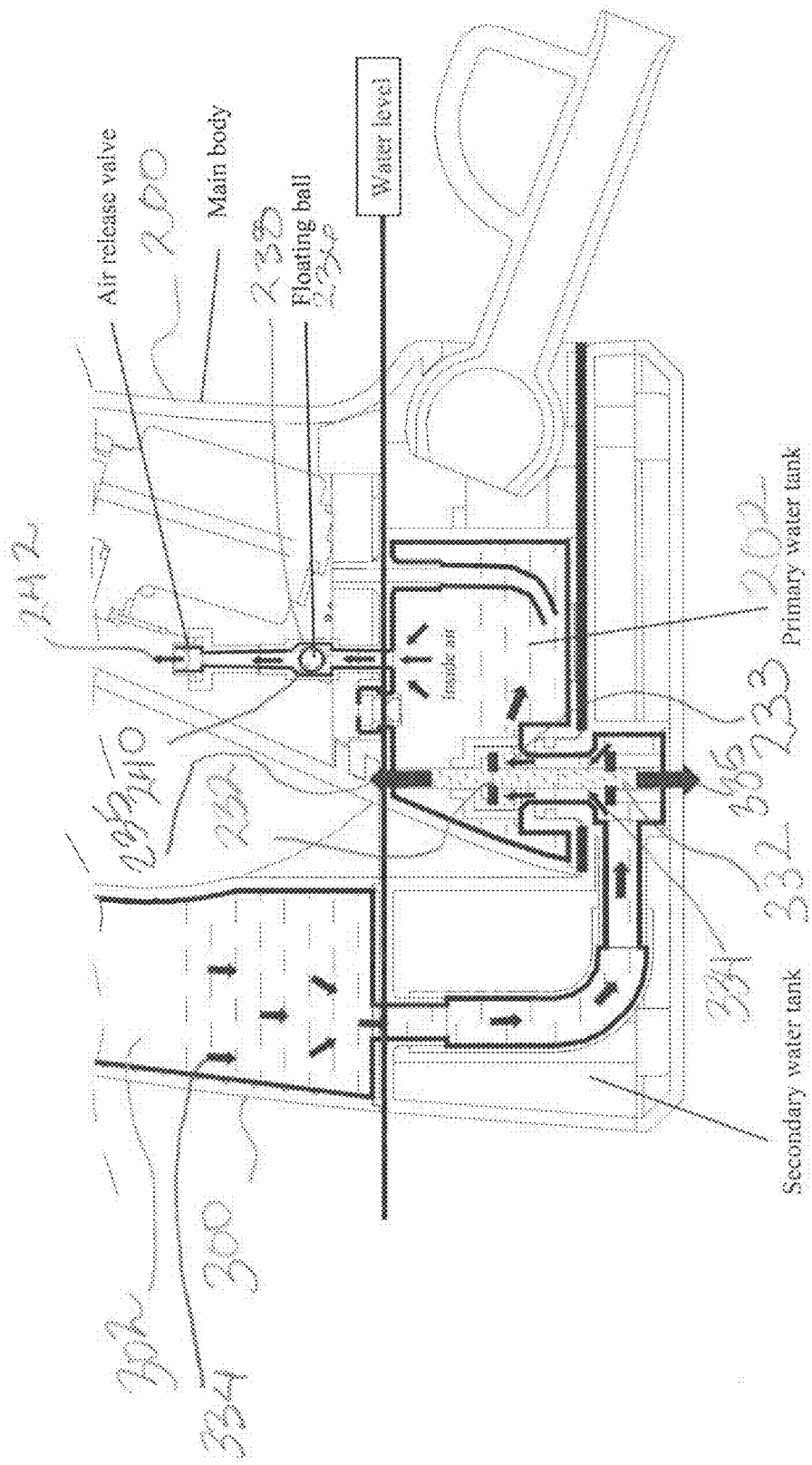
FIG. 12 is an enlarged partial cross-sectional view of the main body with the primary water tank connected to the cradle with the secondary water tank of FIG. 4 schematically showing a flow of water from the secondary water tank to the primary water tank and a flow of air out of the primary water tank.

As shown in FIG. 12, to start refilling primary water tank 202 with water from secondary water tank 302, secondary water tank 302 is plugged into primary water tank 202 to connect primary water valve 232 to secondary water valve 332. Primary water valve 232 and secondary water valve 332 are each spring-loaded valves. Primary water valve 232 is opened by mechanically pushing against secondary water valve 332, as shown by arrow 235. Secondary water valve 332 is opened by mechanically pushing against primary water valve 232, as shown by arrow 335, when secondary water tank 302 is plugged into primary water tank 202 to connect primary water valve 232 to secondary water valve 332. Secondary water tank 302 is preferably positioned higher than primary water tank 202 so that water from secondary water tank 302 flows, as shown by arrows 334, into primary water tank 202, as shown arrows 233, by gravity to refill primary water tank 202 from secondary water tank 302. Air inside primary water tank 202 is released via an air release valve 238 that is float ball valve 236 to balance an internal pressure at the same time as the refilling of primary water tank 202 from secondary water tank 302. A floating ball 240 of float ball valve 236 remains in a bottom position, as shown in FIG. 12, when water has not reached floating ball 240 inside primary water tank 202 during the refilling of primary water tank 202 (from secondary water tank 302) so that the air can still release through air release valve 238, as shown by arrow 242.

As shown in FIG. 13, the refilling of primary water tank 202 from secondary water tank 302 continues until a water level that makes floating ball 240 float up and block an opening 244 in air release valve 238 that stops the refilling of primary water tank 202 from secondary water tank 302. Since the refilling of primary water tank 202 from secondary water tank 302 is by gravity and potential of the water level, the speed of the refilling is very quick, for example, 1 to 10 seconds, depending on tubing 336 and air release design of air release valve 238. Thus, the potential energy of water stored in secondary water tank 302 is at a position so that, when released, gravity causes the level to drop (and thus fill primary water tank 202). Water finds equilibrium when allowed to flow, so flowing water from secondary water tank 302 to primary water tank 202 will occur until pressure is equalized. Secondary water tank 302 can be sized so that primary water tank 202 can be filled by secondary water tank 302 more than once.

Appliance unit 200 can be disconnected from cradle 300 to disconnect primary water tank 202 from secondary water tank 302 during or after refilling. Upon disconnecting primary water tank 202 from secondary water tank 302, primary water valve 232 and secondary water valve 332 each return to their closed position, shown in FIG. 11, since primary water valve 232 and secondary water valve 332 are each spring-loaded. The closed position of primary water valve 232 prevents water from leaking from primary water tank 202. Likewise, the closed position of secondary water valve 332 prevents leaking of water out of secondary water tank 302. Floating ball 240 rests on opening 244 to block it (e.g. to keep out debris and anything else). Opening 244 and floating ball 240 cooperate as a pressure valve so that when water is incoming into primary water tank 202, air from primary water tank 202 is expelled by pushing floating ball 240 upwards, thus keeping the pressure in primary water tank 202 equalized (because if pressure was allowed to build up then water would no longer flow).

Referring to FIGS. 14 and 15, primary water tank 202 can be modified to work with or replace air release valve 238 with an internal tubing path 1400. During refilling of primary water tank 202 from secondary water tank 302, the water refills primary water tank 202 and reaches internal tubing path 1400, as shown by arrows 1402. The water refilling will stop when a water level 346 of secondary water tank 302 is the same as a water level 246 in internal tubing path 1400, as shown in FIG. 15. Internal tubing path 1400 has a height 1404 in appliance unit 200 that extends above a height 348 of secondary water tank 302 so that the water in internal tubing path 1400 will not go above height 348 of secondary water tank 302 and over curve 1406 of internal tubing path 1400. Internal tubing path 1400 has an end 1408 opposite to an end 1410 that connects to primary water tank 202. End 1408 is connected to a bottom of housing 205 for air release and water release when there is misuse.

Referring to FIG. 16, primary water tank 202 can be modified to replace air release valve 238 with an air valve assembly 1600. Also, primary water valve 232 can be replaced with primary water valve 1632, and cradle 300 can be modified to add a cradle lock 310. Primary water valve 1632 is a spring-loaded water valve similar to primary water valve 232. Air valve assembly 1600 has an air valve 1602 connected to internal tubing 1604. Internal tubing 1604 has an end 1606 connected to primary water tank 202 and an end 1608 connected to air valve 1602. Air valve 1602 is a spring-loaded ball valve 1610 that has a valve seat 1612, a ball 1614, a housing 1616 and a spring 1618 that urges ball 1614 against valve seat 1612 to close an opening 1620 formed by valve seat 1612.

Referring to FIGS. 16-18, secondary water tank 302 is plugged into primary water tank 202 to connect and open primary water valve 1632 and secondary water valve 332. Primary water valve 1632 connects and opens the same as primary water valve 232. At the same time, primary water valve 1632 and secondary water valve 332 connect and open and when cradle lock 310 is in an unlocked position, as shown in FIGS. 16-18. There is an actuator 1606 at cradle lock 310 of secondary water tank 302 to open air valve 1602. Actuator 1606 has a projection 1622 that extends from cradle lock 310. Projection 1622 moves with cradle lock 310 in a direction 213 opposite to direction 211, as shown in FIG. 20, to move through opening 1620 formed by valve seat 1612 moving ball 1614 away from opening 1620 to open air valve 1602 when appliance unit 200 is connected to cradle 300. Also, projection 1622 moves with cradle lock 310 in direction 211, as shown in FIG. 19, to move projection 1622 out of opening 1620 so that ball 1614 is moved to cover opening 1620 by bias of spring 1618.

When secondary water tank 302 is plugged into primary water tank 202, primary water valve 1632 and secondary water valve 332 connect and open at the same time when projection 1622 moves through opening 1620 formed by valve seat 1612 to move ball 1614 away from opening 1620 to open air valve 1602 when cradle lock 310 is in the unlocked position. Air flows out of housing 1616 of air valve assembly 1600 through opening 1620, and water from secondary water tank 302 flows into primary water tank 202 through primary water valve 1632 and secondary water valve 332, as shown by arrows 1634, until, as shown in FIG. 18, a water level 1638 in internal tubing 1604 and a water level 1640 in secondary water tank 302 are balanced. If air valve 1602 does not open, then the water from secondary water tank 302 cannot flow into primary water tank 202 due to air trapped inside primary water tank 202 and internal tubing 1604. If appliance unit 200 is disconnected from cradle 300 during or after refilling, primary water valve 1632 and secondary water valve 332 disconnect and close since they are spring-loaded to bias in the closed position, as shown in FIG. 16. At the same time, if cradle lock 310 is in the unlocked position, projection 1622 moves through opening 1620 formed by valve seat 1612 so that ball 1614 is urged by spring 1618 to cover opening 1620 to close air valve 1602.

Air valve assembly 1600 allows for two ways for the user to use appliance 100. The first is where the user can use appliance unit 200 alone for steam ironing where air valve 1602 is closed. The second is where the user can use appliance unit 200 connected to cradle 300 to have a bigger water tank for longer usage time by the user pressing down on cradle lock 310 in direction 211 to trigger two actions: close air valve 1602, and lock and hold cradle 300 with appliance unit 200. Accordingly, as shown in FIG. 19, air valve 1602 is closed when the user uses appliance 100 for steam ironing with appliance unit 200 connected to cradle 300 and the user presses down on cradle lock 310 in direction 211. If the user wants to refill primary water tank 202 from secondary water tank 302, the user presses upward on cradle lock 310 in direction 213, that is opposite to direction 211, to open air valve 1602, as shown in FIG. 20.

Referring to FIG. 19, cradle lock 310 has a user engageable portion 311 and a locking mechanism 350. Locking mechanism 350 mates with an engagement portion 250 of appliance unit 200 to lock appliance unit 200 and cradle 300 together. Locking mechanism 350 has a locking member 352. Although only a single locking member 352 is shown, locking mechanism 350 has two locking members 352 on opposite sides of cradle lock 310 each having a structure that is a mirror image of the other. Each locking member 352 has a connector 354, an extension member 356 and a locking peg 358. User engageable portion 311 has a hole 360 that receives connector 354 so that connector 354 can move in hole 360 to move extension member 356 toward and away from user engageable portion 311. A spring 362 biases extension member 356 toward user engageable portion 311. Each connector 354 of the two locking members 352 abut one another to limit movement in hole 360 of user engageable portion 311. Peg 358 overlaps a projection 252 of engagement portion 250 in the locked position, as shown in FIG. 19. User engageable portion 311 is moved in direction 213 from the locked position to the unlocked position, as shown in FIG. 20, which moves extension member 356 away from user engageable portion 311 against the bias of spring 352 to move peg 358 outward so that peg 358 does not overlap projection 252 of engagement portion 250.

In the unlocked position, appliance unit 200 can be disconnected from cradle 300. Primary water valve 1632 and secondary water valve 332 are also connected in the unlocked position and air valve 1602 is open so that water is can be refilled in primary water tank 202 from secondary water tank 302. User engageable portion 311 is moved in direction 211 from the unlocked position to the locked position, as shown in FIG. 19, which moves extension member 356 toward user engageable portion 311 by the bias of spring 352 to move peg 358 inward so that peg 358 overlaps projection 252 of engagement portion 250.

In the locked position, appliance unit 200 is locked together with cradle 300. Primary water valve 1632 and secondary water valve 332 are also connected in the locked position. However, air valve 1602 is closed so that water is not refilled in primary water tank 202 from secondary water tank 302.

Air valve assembly 1600 operates so that refilling of primary water tank 202 from secondary water tank 302 based on air valve 1602 can be integrated and work with cradle lock 310 to control the opening and closing of air valve 1602. When air valve 1602 is opened, a water level in primary water tank 202 can be balanced. When air valve 1602 is closed, water is prevented from escaping via internal tubing 1604 during use of appliance unit 200 for steam ironing.

Figure 21:
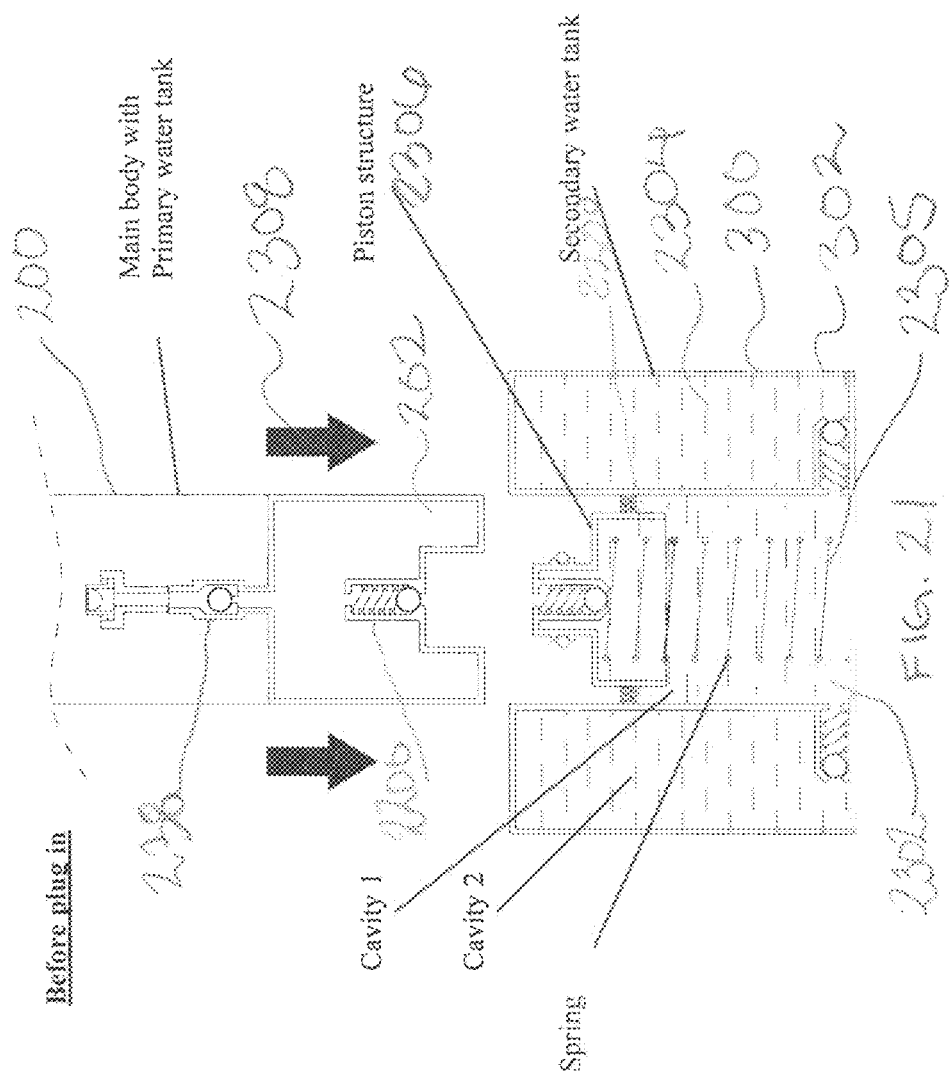
FIG. 21 is a front cross-sectional view of the main body with the primary water tank separated from the cradle with the secondary water tank of the fabric steamer of FIG. 1 that is modified with another alternative water refill system having a manual pump refill.

Referring to FIG. 21, primary water tank 202 can be modified to replace air valve 228 and primary water valve 232 with a receptacle assembly 2200, and cradle 300 can be modified to replace secondary water valve 332 with a manual pump assembly 2300. Secondary water tank 302 has a first cavity 2302 and a second cavity 2304. First cavity 2302 holds water to be transferred to primary water tank 202. Second cavity 2304 holds water to be transferred to first cavity 2302. Secondary water tank 302 has a spring 2305 connected between a piston 2306 and first cavity 2302 so that when piston 2306 is moved in a direction 2308, pressure will be applied to water in first cavity 2302 by piston 2306 so that water will pump out of first cavity 2302 through piston 2306, as shown in FIG. 22, forming a manual pump. When piston 2306 is moved in a direction 2308, spring 2305 is energized. Secondary water tank 302 has a first single way valve 2310 and a second single way valve 2312 that are closed when piston 2306 is moved in a direction 2308 due to pressure applied by each of their springs and the water being pumped to primary water tank 202. Secondary water tank 302 has a third single way valve 2314 and primary water tank 202 has a fourth single way valve 2214 that are opened when piston 2306 is moved in a direction 2308 due to the pressure on the water in first cavity 2302 applied by piston 2306 that overcomes the force applied by the springs of each third single way valve 2314 and fourth single way valve 2214. By overcoming the force applied to the springs, water in first cavity 2302, as shown by arrows 2316, can pass through third single way valve 2314 and fourth single way valve 2214 into primary water tank 202, as shown by arrows 2216. First single way valve 2310, second single way valve 2312, third single way valve 2314 and fourth single way valve 2214 are spring-loaded ball valves similar to spring-loaded ball valve 1610, however, other valves can be used. Further, due to first single way valve 2310 and second single way valve 2312 being closed, no water will flow back to second cavity 2304. Primary water tank 202 is refilled when piston 2306 is moved to a bottom 2318 of first cavity 2302.

After the refill of primary water tank 202 by piston 2306 moved to a bottom 2318 of first cavity 2302, appliance unit 200 is removed from cradle 300, as shown by arrows 2210 in FIG. 23. Upon removal, spring 2305 becomes deenergized to push piston 2306 upward, as shown by arrow 2320, to an original position as shown in FIG. 21. When spring 2305 becomes deenergized to push piston 2306 to the original position, first single way valve 2310 and second single way valve 2312 are opened due to the relief of pressure from the water in first cavity 2302 and pressure applied by each of the springs of first single way valve 2310 and second single way valve 2312. Further, third single way valve 2314 and fourth single way valve 2214 are closed due to the relief of the pressure from the water in first cavity 2302 and pressure applied by each of the springs of third single way valve 2314 and fourth single way valve 2214 so that water in second cavity 2304 will pump into first cavity 2302, as shown by arrows 2322 in FIG. 23, to refill first cavity 2302 with water. Thus, when appliance unit 200 is connected again to cradle 300 primary water tank 202 is refilled. When third single way valve 2314 and fourth single way valve 2214 are closed, water leaking when appliance unit 200 is removed from cradle 300 is prevented. The benefit of receptacle assembly 2200 and manual pump assembly 2300 is instant refill. Thus, the whole refill cycle is complete by one press down of piston 2306.

Referring to FIG. 24, primary water tank 202 can be modified to replace air valve 228 and primary water valve 232 with a receptacle assembly 2500. Also, cradle 300 can be modified to replace secondary water valve 332 with an electric pump assembly 2600. Receptacle assembly 2500 has a primary connection valve 2504 in primary water tank 202. Electric pump assembly 2600 has an electric pump 2602 housed in a cavity 2603 and a secondary connection valve 2604 in secondary water tank 302. Primary connection valve 2504 and secondary connection valve 2604 are spring-loaded ball valves similar to spring-loaded ball valve 1610, however, other valves can be used. Electric pump 2602 is triggered when appliance unit 200 is connected to cradle 300, as shown by arrows 2502. Primary water tank 202 has a cavity 2509 and secondary water tank 302 has a protrusion 2609 that fits in cavity 2509 to connect primary connection valve 2504 and secondary connection valve 2604. Water in secondary water tank 302 is pumped by electric pump 2602, as shown by arrows 2608, through secondary connection valve 2604 and primary connection valve 2504, as shown by arrows 2508, to primary water tank 202. The force generated by the water pumped by electric pump 2602 opens secondary connection valve 2604 and primary connection valve 2504. The water pressure from electric pump 2602 pushes both ball valves of primary connection valve 2504 and secondary connection valve 2604 up overcoming their biasing springs. Once primary water tank 202 is filled, a sensor or switch, for example, as shown in FIG. 26, a sensor can sense when floating ball 240 floats up and blocks opening 244 in air release valve 238, and will provide feedback to electric pump 2602 or a controller of electric pump 2602 to stop electric pump 2602. Once primary water tank 202 is filled, appliance unit 200 is removed from cradle 300 and primary connection valve 2504 and secondary connection valve 2604 each close due to the relief of the force generated by the water pumped by electric pump 2602 to prevent water leakage.

Accordingly, if appliance unit 200 uses all of the water in primary water tank 202, then the user can refill primary water tank 202 from secondary water tank 302 instead of needing to undesirably wait for the appliance unit 200 to cool off before refilling primary water tank 202 if the user has not finished using appliance unit 200. Appliance 100 also allows for use of appliance unit 200 without cradle 300 to avoid requiring an undesirably heavier weight of secondary water tank 302 that is instead optional.

What is claimed is:

1. An appliance comprising:
   an appliance unit having a housing;
   a heater in the housing, the housing having steam emission holes;
   a primary water tank in the housing;
   a cradle that is removably connectable to the appliance unit, the cradle having a secondary water tank that can communicate with the primary water tank when the appliance unit is connected to the cradle,
   wherein the appliance unit can operate to emit steam when disconnected from the cradle, and
   wherein the appliance unit can operate to emit steam when connected to the cradle.

2. The appliance of claim 1, wherein the secondary water tank extends a water supply to the primary water tank when the cradle is connected to the appliance unit during operation of the appliance unit.

3. The appliance of claim 1, wherein the secondary water tank refills the primary water tank and extends a water supply to the primary water tank when the cradle is connected to the appliance unit during operation of the appliance unit.

4. The appliance of claim 1, wherein the secondary water tank refills the primary water tank more than once.

5. The appliance of claim 1, wherein the secondary water tank refills the primary water tank with a speed that is controlled by an air release valve and tubing.

6. The appliance of claim 1, wherein the primary water tank has a valve to balance a pressure inside the primary water tank.

7. The appliance of claim 1, wherein the secondary water tank refills the primary water tank by a manual pump.

8. The appliance of claim 1, wherein the secondary water tank refills the primary water tank by an electric pump.

9. The appliance of claim 1, wherein the secondary water tank refills the primary water tank.

10. The appliance of claim 9, wherein the secondary water tank refills the primary water tank by gravity.

11. The appliance of claim 9, wherein the secondary water tank refills the primary water tank by potential difference of a water level in secondary water tank and a water level in primary water tank.

12. The appliance of claim 9, wherein the primary water tank is connected to tubing.

13. The appliance of claim 9, wherein the primary water tank has a floating ball valve.

14. The appliance of claim 13, wherein the secondary water tank refills the primary water tank until the floating ball valve stops the refill.

15. An appliance comprising:
an appliance unit having a housing;
a heater in the housing, the housing having steam emission holes;
a primary water tank in the housing;
a cradle that is removably connectable to the appliance unit, the cradle having a secondary water tank that can communicate with the primary water tank when the appliance unit is connected to the cradle, wherein the secondary water tank refills the primary water tank, wherein the primary water tank is connected to tubing, wherein the tubing has an air valve.

16. The appliance of claim 15, wherein the secondary water tank has a lock that controls both the air valve and locking the appliance unit to the cradle.

17. An appliance comprising:
an appliance unit having a housing;
a heater in the housing, the housing having steam emission holes;
a primary water tank in the housing;
a cradle that is removably connectable to the appliance unit, the cradle having a secondary water tank that can communicate with the primary water tank when the appliance unit is connected to the cradle, wherein the secondary water tank refills the primary water tank, wherein the primary water tank is connected to tubing, wherein the tubing has a height that extends above a height of secondary water tank so that the secondary water tank refills the primary water tank by potential difference of a water level in secondary water tank and a water level in the tubing.

* * * * *